(12) United States Patent  
Ring et al.

(10) Patent No.: US 6,619,443 B2  
(45) Date of Patent: Sep. 16, 2003

(54) OVERLOAD PROTECTION DEVICE FOR A TRUCK-MOUNTED BRAKE ASSEMBLY

(75) Inventors: Michael E. Ring, Crown Point, IN (US); Michael J. Moriarity, Lansing, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 30 days.

(21) Appl. No.: 09/876,612

(22) Filed: Jun. 7, 2001

(65) Prior Publication Data

US 2002/0185339 A1 Dec. 12, 2002

(51) Int. Cl.$^7$ ............................................... B61H 13/00
(52) U.S. Cl. ............................ 188/153 R; 188/151 A; 188/33
(58) Field of Search .................. 188/33, 46, 49–56, 188/153 R, 153 D, 153 A, 151 A

(56) References Cited

U.S. PATENT DOCUMENTS 5,664,478 A * 9/1997 Pierce ........................ 361/752
6,279,689 B1 * 8/2001 Zemyan .................... 188/153 R

* cited by examiner

Primary Examiner—Matthew C. Graham  
(74) Attorney, Agent, or Firm—James Ray & Associates

(57) ABSTRACT

An overload protection device for a truck-mounted railcar brake assembly, comprising a body member having a first end, a second end, and at least one cavity of a predetermined size and shape disposed within the body member. A compression member of a predetermined size, shape, material, and load rating is compressed to a predetermined initial load and disposed within the cavity of the body member. A first means is secured to and disposed on the first end of the body member for engagement with a portion of a brake assembly. A second means is disposed on the second end of the body member for attaching to a force-transmitting member. A first portion of the second means is engageable with the compression member for transmitting an excess force generated from such railcar brake assembly to the compression member, whereby the overload protection device will compensate for a potential railcar brake overload condition.

21 Claims, 2 Drawing Sheets

US 6,619,443 B2

OVERLOAD PROTECTION DEVICE FOR A TRUCK-MOUNTED BRAKE ASSEMBLY

FIELD OF THE INVENTION

The present invention relates, in general, to a truck-mounted brake assembly, and more particularly, to an overload protection device for a truck-mounted brake assembly on a railcar.

BACKGROUND OF THE INVENTION

Prior to the present invention, the brakes on a truck-mounted brake assembly operate through the brake rigging either pneumatically, in response to the supply and release of compressed air at a brake cylinder device, or manually, in response to the operation of the railway car handbrake wheel. As illustrated in FIG. 3, the assembly consists of truss-type brake beams, with one beam having an expansible brake actuator in the form of a brake cylinder mounted thereon. The brake rigging operates in response to the supply and release of compressed air from the brake cylinder. Having its fixed end secured to the left-hand side of the compression member of the brake beam, the brake cylinder responds to the supply of compressed air by an axial expansion of its free end relative to its fixed end. Being connected to an equalizing lever by a force transmitting member, the free end of the brake cylinder effects rotation of the equalizing lever about a pivot pin in a counterclockwise direction, as the brake cylinder expands axially with the supply of compressed air. This counterclockwise rotation of the equalizing lever results in the force-transmitting member being moved in the direction of the right hand, to effect counterclockwise rotation of the equalizing lever about its pivot pin. A portion of the force-transmitting member is secured to the fixed end of the brake cylinder, where resistance to movement is encountered at the end of the equalizing lever connected to the force-transmitting member by the pin, so that this lever acts as a second-class lever. The force exerted at the other end of the equalizing lever from the force-transmitting member causes the equalizing lever to pivot about its connection with the force-transmitting member and thereby move the brake beam in the direction of the right hand through the connection of the equalizing lever with the strut bar, thereby bringing the brake shoes of the brake head and brake shoe assemblies associated with the brake beam into engagement with the wheel treads of the wheel/axle unit. Once this brake shoe engagement occurs, the connection of equalizing lever with the force-transmitting member becomes solid, and the equalizing lever becomes a second-class lever. Thus, the continued expansion of the free end of the brake cylinder causes a counterclockwise rotation of the equalizing lever to take place by pivotal rotation about the pin connection of the equalizing lever with the force-transmitting member. Accordingly, the force of expansion of the brake cylinder acts through the pin of the equalizing lever and the strut bar to force the brake beam in the direction of the left-hand, thereby bringing the brake shoes of the brake head and the brake shoe assemblies associated with the other brake beam into engagement with the wheel treads of the second wheel/axle unit.

An example of this type of truck-mounted brake assembly is taught in U.S. Pat. No. 4,613,016. The teachings of this reference are incorporated herein by reference thereto.

Similarly, rotation of the end of the actuating lever in a counterclockwise rotation, when the handbrake chain is taken up in a well-known manner, affects the same result. An example of this type of truck-mounted brake assembly is taught in U.S. Pat. No. 5,069,312. The teachings of this reference are incorporated herein by reference thereto.

A common practice in the railway industry is to activate the pneumatic, and then the manual brake systems on a single railcar as a precaution against unwanted or unexpected movement of the car. This multiplies the forces on the brake assembly; therefore the brake beams may be subjected to a force exceeding their ultimate load capacity, thus causing deflection and premature failure. The present invention is designed with a preloaded compression member to absorb the excess force before deflection and possible failure of the brake beam occurs.

SUMMARY OF THE INVENTION

In a first aspect, the present invention provides an overload protection device for a truck-mounted brake assembly comprising a body member having a first end, a second end, at least one cavity of a predetermined size and shape disposed within the body member, and a compression member of a predetermined size, shape, material, and load rating, having a primary end and a secondary end. The compression member is compressed to a predetermined initial load, and is disposed within the cavity of the body member. The present invention further comprises a first means secured to and disposed on the first end of the body member for engagement with a portion of a brake assembly, and a second means disposed on the second end of the body member for attaching to a force-transmitting member. A first portion of the second means is engageable with the compression member for transmitting an excess force generated from a railcar brake assembly to the compression member, whereby the overload protection device will compensate for a potential railcar brake overload condition.

In a further aspect, the present invention provides an overload protection device for a truck-mounted brake assembly comprising a body member having a first end, a second end, at least one cavity of a predetermined size and shape disposed within the body member, and a compression member of a predetermined size, shape, material, and load rating. The compression member is compressed to a predetermined initial load, and is disposed within the cavity of the body member. A flange of a predetermined size and shape has a first surface and a second surface. The first surface is disposed on the second end of the body member. A first means is secured to and disposed on the first end of the body member for engagement with a portion of the brake assembly. A second means is reciprocally mounted adjacent to the second end of the body member for attaching to a force-transmitting member. A first portion of the second means is engageable with the compression member for transmitting an excess force generated from a railcar brake assembly to the compression member. A retaining element is secured to and disposed on the second surface of the flange. The retaining element has an aperture of a predetermined size and shape concentrically disposed therein, wherein a second portion of the second means is reciprocally disposed therein. The overload protection device will compensate for a potential railcar brake overload condition.

In still a further aspect, the present invention provides an overload protection device for a truck-mounted brake assembly comprising a body member having a first end, a second end, and at least one cavity of a predetermined size and shape disposed within the body member. A compression member of a predetermined size, shape, material, and load rating has a primary end, a secondary end, and a concentric bore of a predetermined size and shape disposed from the primary end to the secondary end. The compression member is disposed within the cavity of the body member. A first means is secured to and disposed on the first end of the body member for engaging a portion of the brake assembly. A second means is disposed within the concentric bore of the compression member, and is engageable with the compression member and connectable to a force-transmitting member. A securement member is disposed on the second end of the body member for securing the compression member in the cavity of the body member, whereby the overload protection device will compensate for a potential railcar brake overload condition.

In addition to the various objects of the invention that have been described above, various other objects and advantages of the invention will become more readily apparent to those persons skilled in the relevant art from the following more detailed description of the invention, particularly, when such description is taken in conjunction with the attached drawing figures and the appended claims.

OBJECTS OF THE INVENTION

It is therefore a primary object of the present invention to provide a device to protect brake overload in a truck-mounted brake assembly on a railcar.

Another object of the present invention is to provide a device to protect brake overload in a truck-mounted brake assembly on a railcar by compensating for multiple forces that may exceed the ultimate load capacity of the brake beams.

Still a further object of the present invention is to provide a device to protect brake overload in a truck-mounted brake assembly on a railcar by absorbing the excess force before deflection and possible brake beam failure occurs.

In addition to the various objects of the invention that have been described above, various other objects and advantages of the invention will become more readily apparent to those persons skilled in the relevant art from the following more detailed description of the invention, particularly, when such description is taken in conjunction with the attached drawing figures and the appended claims.

DETAILED DESCRIPTION OF THE INVENTION

Figure 1:
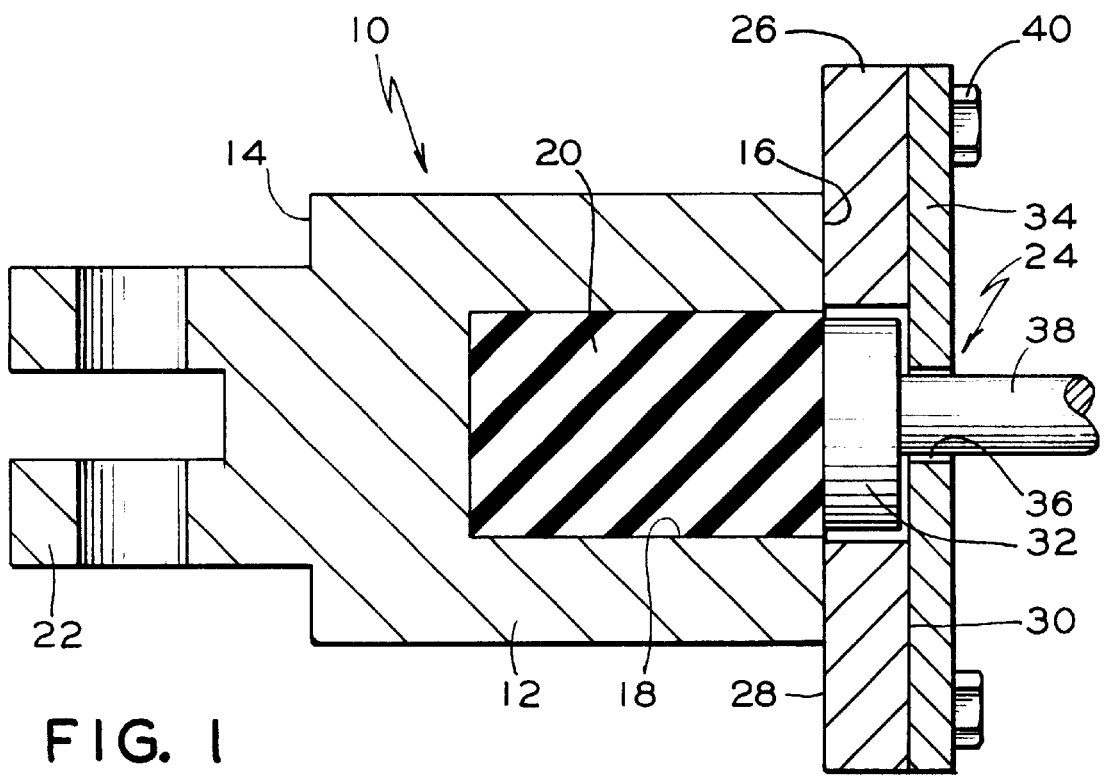
FIG. 1 is an elevation cross-sectional view of the overload protection device.

Prior to proceeding to a more detailed description of the invention, it should be noted that identical components having identical functions have been designated with identical reference numerals for the sake of clarity.

Figure 3:
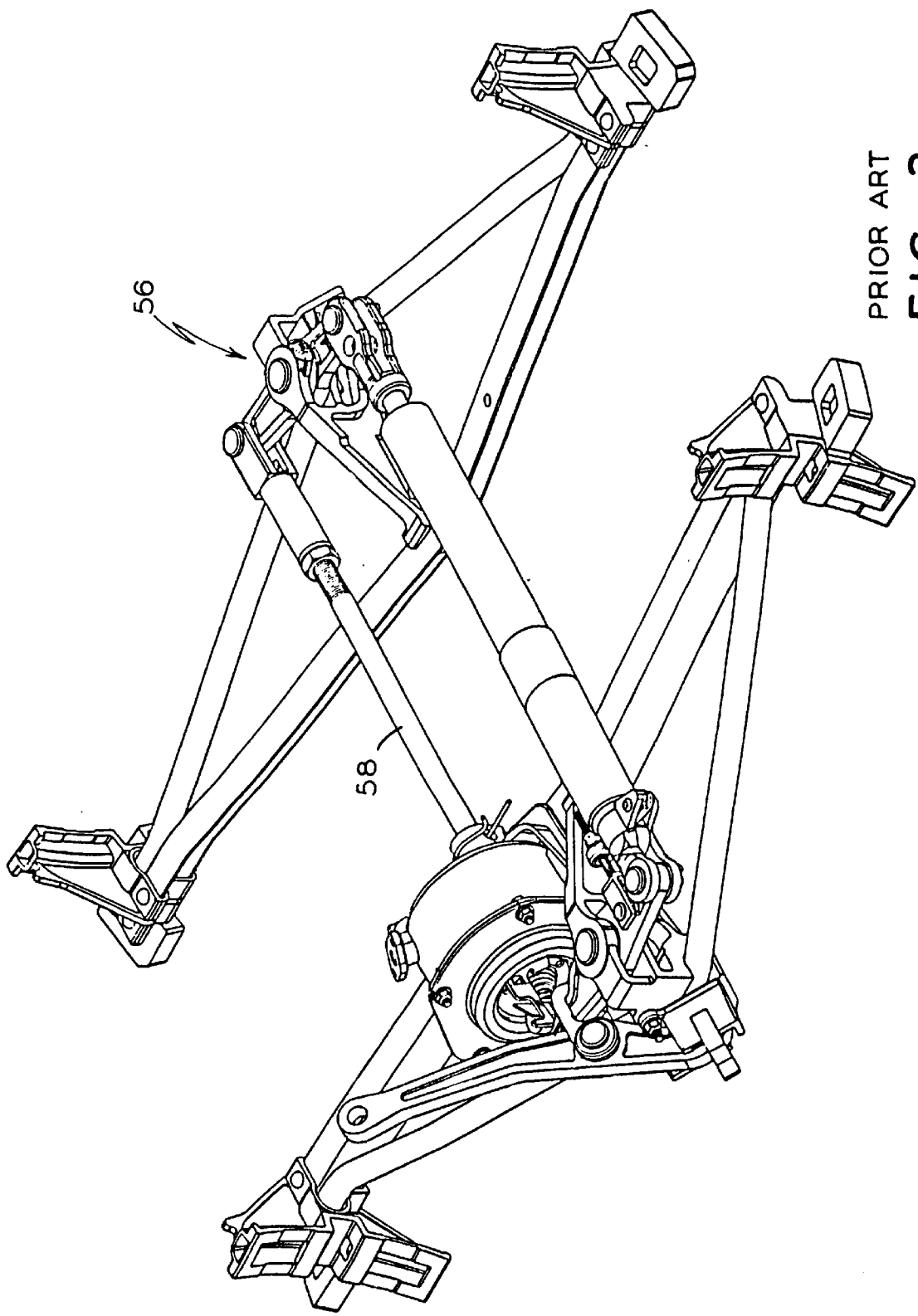
FIG. 3 is a plan view, which shows a truck-mounted brake assembly having a conventional prior art pneumatic brake cylinder device, and is accordingly labeled "Prior Art".

Referring more particularly to FIGS. 1 and 3 of the drawings is an overload protection device, generally designated 10, for a truck-mounted railcar brake assembly, generally designated 56. The overload protection device 10 comprises a body member 12 having a first end 14, a second end 16, and at least one cavity of a predetermined size and shape disposed within the body member 12. A compression member 20 of a predetermined size, shape, material, and load rating is compressed to a predetermined initial load and disposed within the cavity 18 of the body member 12. Preferably, the compression member 20 is selected from the group consisting of compression spring, Belleville spring, and elastomer. It is also preferred that the predetermined initial load of the compression member 20 is about 10,000 pounds. A first means 22 is secured to and disposed on the first end 14 of the body member for engagement with a portion of the brake assembly 56. A second means, generally designated 24, is disposed on the second end 16 of the body member 12 for attaching to a force-transmitting member 58. A first portion 32 of the second means 24 is engageable with the compression member 20 for transmitting an excess force generated from the railcar brake assembly 56 to the compression member 20. The overload protection device 10 will compensate for a potential railcar brake overload condition.

Now refer again to FIGS. 1 and 3 of the drawings. Illustrated therein is a preferred embodiment of the overload protection device, generally designated 10, for a truck-mounted railcar brake assembly generally designated 56. The overload protection device 10 comprises a body member 12 having a first end 14, a second end 16, and at least one cavity 18 of a predetermined size and shape disposed within the body member 12. A compression member 20 of a predetermined size, shape, material, and load rating is compressed to a predetermined initial load and disposed within the cavity 18 of the body member 12. Preferably, the compression member 20 is selected from the group consisting of compression spring, Belleville spring, and elastomer. It is also preferred that the predetermined initial load of the compression member 20 is about 10,000 pounds. A flange 26 of a predetermined size and shape has a first surface 28 and a second surface 30. The preferred shape of the flange 26 is annular. The first surface 28 is disposed on the second end 16 of the body member 12. A first means 22 is secured to and disposed on the first end 14 of the body member 12 for engagement with a portion of the brake assembly 56. A second means, generally designated 24, is reciprocally mounted adjacent to the second end 16 of the body member 12 for attaching to a force-transmitting member 58. A first portion 32 of the second means 24 is engageable with the compression member 20 for transmitting an excess force generated from the railcar brake assembly 56 to the compression member 20. Preferably, the first portion 32 is a plate-like member. A retaining element 34 is secured to and disposed on the second surface 30 of the flange 26. The retaining element 34 has an aperture 36 of a predetermined size and shape concentrically disposed therein; wherein a second portion 38 of the second means 24 is reciprocally disposed therein. Preferably, the second portion 38 is a push rod, and the retaining element 34 has an attachment means 40 to said flange 26, which is a plurality of bolts having a predetermined length and diameter. This arrangement will permit the overload protection device 10 to compensate for a potential railcar brake overload condition.

Figure 2:
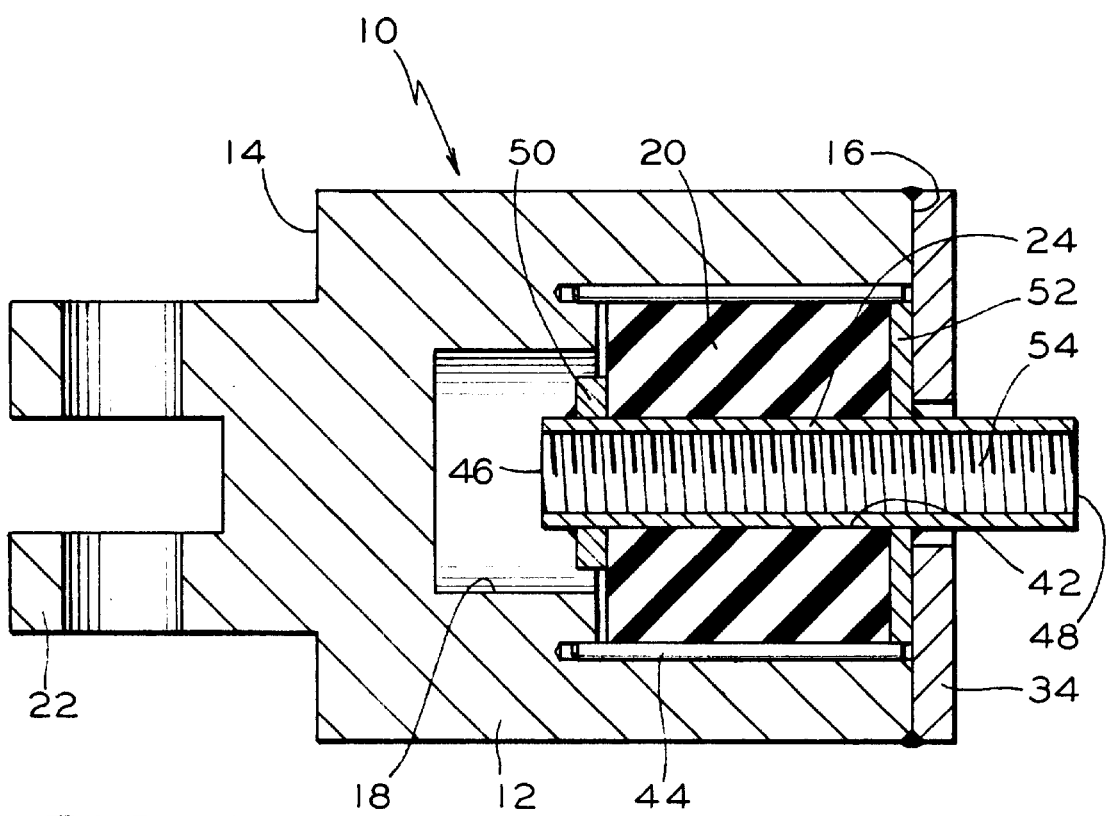
FIG. 2 is an elevation cross-sectional view of an alternate configuration of the overload protection device.

Now refer more particularly to FIGS. 2 and 3 of the drawings. Illustrated therein is an overload protection device, generally designated 10, for a truck-mounted railcar brake assembly generally designated 56. The overload protection device 10 comprises a body member 12 having a first end 14, a second end 16, and at least one cavity 18 of a predetermined size and shape disposed within the body member 12. Preferably, the cavity 18 is cylindrical shaped. A compression member 20 of a predetermined size, shape, material, and load rating has a concentric bore 42 of a predetermined size and shape disposed within. The preferred shape of the compression member 20 is cylindrical. The compression member 20 is compressed to a predetermined initial load, and disposed within the cavity 18 of the body member 12. Preferably, an alignment means 44, which is at least one guide pin of a predetermined length and diameter, is disposed within the cavity 18 of the body member 12 for engaging with the compression member 20. This alignment means 44 will maintain the compression member 20 in a predetermined location. It is preferred that the compression member 20 is selected from the group consisting of compression spring, Belleville spring, and elastomer. It is also preferred that the predetermined initial load of the compression member 20 is about 10,000 pounds. A first means 22 is secured to and disposed on the first end 14 of the body member 12 for engaging a portion of the brake assembly 56. It is preferred that the first means 22 is an integrally cast coupling device. A second means 24 is disposed within the concentric bore 42 of the compression member 20. This second means 24 is engageable with the compression member 20 and connectable to a force-transmitting member 58. Preferably, the second means 24 is a cylindrical tube having a primary end 46 and a secondary end 48, disposed within the concentric bore 42 of the compression member 20. Also preferred is the second means 24 has a threaded inside diameter 54 to accept a threaded push rod. The primary end 46 has a retaining member 50 disposed thereon and engageable with the compression member 20. Preferably, the retaining member 50 is a washer of a predetermined thickness, inside diameter, and outside diameter. Preferably, the washer is welded to the second means 24. The secondary end 48 has a compression element 52 disposed thereon. The compression element 52 is engageable with the compression member 20. Preferably, the compression element 52 is a washer of a predetermined thickness, inside diameter, and outside diameter. Preferably, the washer is welded to the second means 24. A retaining element 34 is secured to and disposed on the second end 16 of the body member 12 for securing the compression member 20 in the cavity 18 of the body member 12. Preferably, the retaining element 34 is a washer of a predetermined thickness, inside diameter, and outside diameter, and is welded to the second end 16 of the body member 12. The overload protection device 10 will compensate for a potential railcar brake overload condition.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. An overload protection device for a truck-mounted railcar brake assembly, said overload protection device comprising:
   (a) a body member having a first end, a second end, and at least one cavity of a predetermined size and shape disposed within said body member;
   (b) a compression member of a predetermined size, shape, material, and load rating, said compression member compressed to a predetermined load, and disposed within said cavity of said body member;
   (c) a first means secured to and disposed on said first end of said body member for engagement with a portion of such brake assembly; and
   (d) a second means disposed on said second end of said body member for attaching to a force transmitting member, a first portion of said second means engageable with said compression member for transmitting an excess force generated from said force transmitting member to said compression member, said excess force being generated during application of such railcar brake assembly, whereby said overload protection device will compensate for a potential railcar brake overload condition.

2. The overload protection device according to claim 1 wherein said compression member is selected from the group consisting of a compression spring, Belleville spring, and elastomer.

3. The overload protection device according to claim 1 wherein said predetermined load is about 10,000 pounds.

4. An overload protection device for a truck-mounted railcar brake assembly, said overload protection device comprising:
   (a) a body member having a first end, a second end, and at least one cavity of a predetermined size and shape disposed within said body member;
   (b) a compression member of a predetermined size, shape, material, and load rating, said compression member compressed to a predetermined load, and disposed within said cavity of said body member;
   (c) a flange of a predetermined size and shape having a first surface and a second surface, said first surface disposed on said second end of said body member;
   (d) a first means secured to and disposed on said first end of said body member for engagement with a portion of such brake assembly;
   (e) a second means reciprocally mounted adjacent said second end of said body member for attaching to a force transmitting member, a first portion of said second means engageable with said compression member for transmitting an excess force generated from said force transmitting member to said compression member, said excess force being generated during application of such railcar brake assembly; and
   (f) a retaining element secured to and disposed on said second surface of said flange, said retaining element further having an aperture of a predetermined size and shape concentrically disposed therein, wherein a second portion of said second means is reciprocally disposed therein, whereby said overload protection device will compensate for a potential railcar brake overload condition.

5. The overload protection device according to claim 4 wherein said retaining element has an attachment means to said flange.

6. The overload protection device according to claim 5 wherein said attachment means is a plurality of bolts having a predetermined length and diameter.

7. An overload protection device for a truck-mounted railcar brake assembly, said overload protection device comprising:
   (a) a body member having a first end, a second end, and at least one cavity of a predetermined size and shape disposed within said body member;
   (b) a compression member of a predetermined size, shape, material, and load rating, having a concentric bore of a predetermined size and shape disposed within, compressed to a predetermined load, said compression member disposed within said cavity of said body member;
   (c) a first means secured to and disposed on said first end of said body member for engaging a portion of such brake assembly;

(d) a second means disposed within said concentric bore of said compression member, engageable with said compression member and connectable to a force transmitting member; and (e) a retaining element secured to and disposed on said second end of said body member for securing said compression member in said cavity of said body member, whereby said overload protection device will compensate for a potential railcar brake overload condition during application of such railcar brake assembly.

8. The overload protection device according to claim 7 wherein an alignment means is disposed within said cavity of said body member for engaging said compression member for maintaining said compression member in a predetermined location.

9. The overload protection device according to claim 8 wherein said alignment means is at least one guide pin of a predetermined length and diameter.

10. The overload protection device according to claim 7 wherein said cavity is a cylindrical shape.

11. The overload protection device according to claim 7 wherein said shape of said compression member is cylindrical.

12. The overload protection device according to claim 7 wherein said first means is a coupling device.

13. The overload protection device according to claim 12 wherein said coupling device is integrally cast.

14. The overload protection device according to claim 7 wherein said second means is a cylindrical tube having a primary end and a secondary end, said cylindrical tube disposed within said concentric bore of said compression member, said primary end further having a retaining member disposed thereon and engageable with said compression member, and said secondary end further having a compression element disposed thereon, said compression element engageable with said compression member.

15. The overload protection device according to claim 7 wherein said second means has a threaded inside diameter to accept a threaded push rod.

16. The overload protection device according to claim 14 wherein said retaining member is a washer of a predetermined thickness, inside diameter, and outside diameter.

17. The overload protection device according to claim 16 wherein said washer is welded to said second means.

18. The overload protection device according to claim 14 wherein said compression element is a washer of a predetermined thickness, inside diameter, and outside diameter.

19. The overload protection device according to claim 18 wherein said washer is welded to said second means.

20. The overload protection device according to claim 7 wherein said retaining element is a washer of a predetermined thickness, inside diameter, and outside diameter, and is welded to said second end of said body member.

21. An overload protection device for a truck-mounted railcar brake assembly, such truck-mounted railcar assembly including an air cylinder, an air cylinder transfer lever, a slack adjuster assembly, a non-air cylinder transfer lever and a force transfer lever positioned between such air cylinder and such non-air cylinder transfer lever, said overload protection device comprising:

(a) a body member having a first end, a second end, and at least one cavity of a predetermined size and shape disposed within said body member;

(b) a compression member of a predetermined size, shape, material, and load rating, said compression member compressed to a predetermined load, and disposed within said cavity of said body member;

(c) a first means secured to and disposed on said first end of said body member for engagement with a portion of such non-air cylinder transfer lever; and (d) a second means disposed on said second end of said body member for attaching to such force transmitting member, a first portion of said second means engageable with said compression member for transmitting an excess force generated from said force transmitting member to said compression member, said excess force being generated during application of such railcar brake assembly, whereby said overload protection device will compensate for a potential railcar brake overload condition.

* * * * *